Patented Oct. 18, 1955

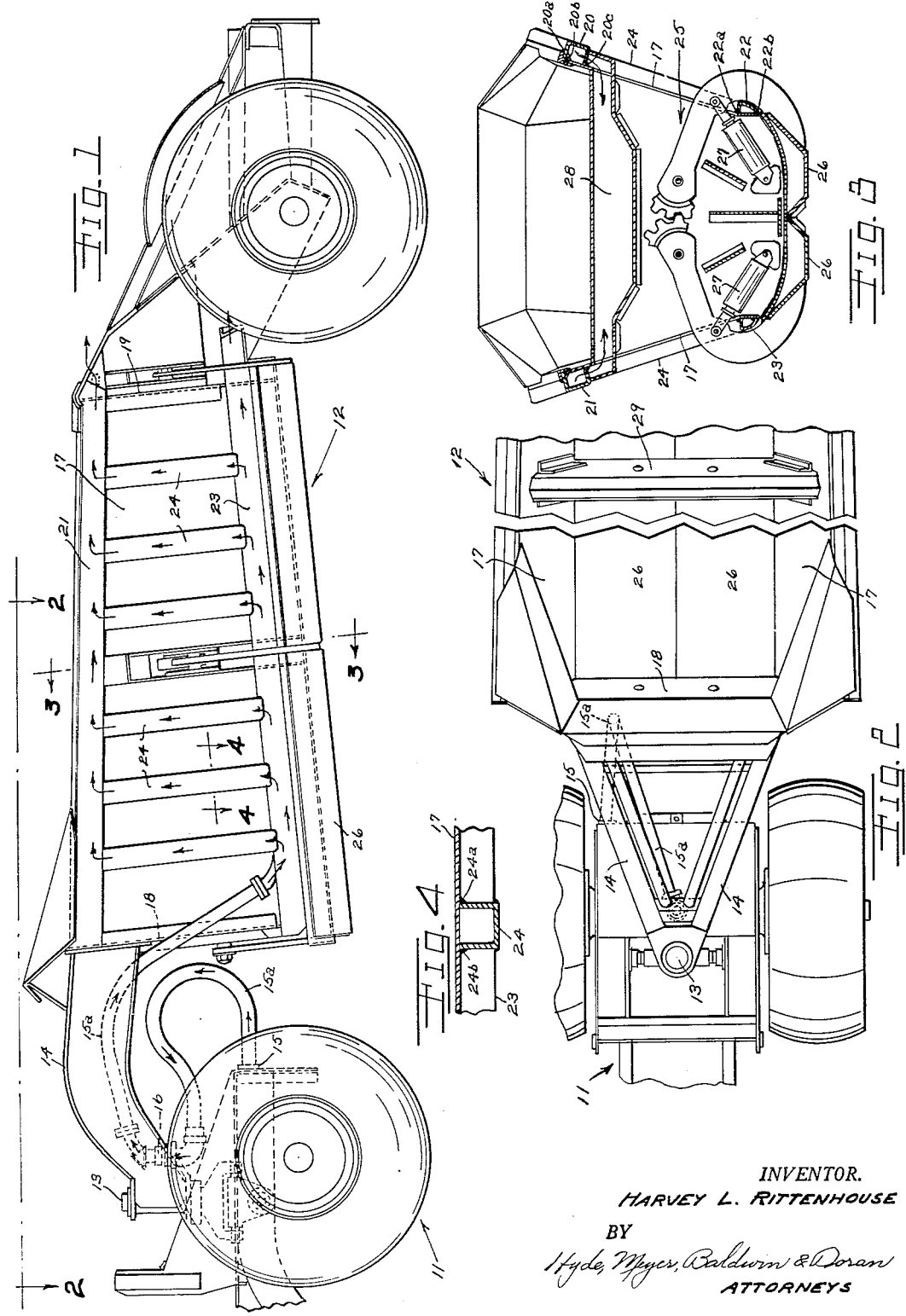

2,721,097

EXHAUST HEATING SEMI-TRAILER BODIES

Harvey L. Rittenhouse, Cleveland Heights, Ohio, assignor, by mesne assignments, to General Motors Corporation, Detroit, Mich., a corporation of Delaware Application May 16, 1951, Serial No. 226,687

3 Claims. (Cl. 298—1)

This invention relates to improvements in bottom dump bodies or wagons and more particularly to those being heated for operation in sub-freezing weather.

The subject matter of this invention is also disclosed in the copending application of Stewart Armington on "Clam Shell Door Construction," Serial No. 241,431, filed August 11, 1951.

One of the objects of the present invention is to provide in a dump body of the type described hot gas conveying means associated with the load supporting walls of the dump body to prevent freezing of the moisture in the dump body load during sub-freezing weather. Hence, the moisture in the load will not freeze and form a bridge to prevent easy dumping of the load.

Another object of the present invention is to provide in a dump body of the type described hollow ribs in the side walls of the dumping body to strengthen the side walls and heat the load supporting surfaces of the walls.

Other features of my invention reside in the arrangement and design of the parts for carrying out their appropriate functions.

Other objects and advantages of my invention will be apparent from the accompanying drawings and description, and the essential features will be set forth in the appended claims.

In the drawings,

Fig. 1 is an elevational view of the heated, bottom dump body or wagon of this invention attached to a propelling vehicle;

Fig. 2 is a top view of the wagon and vehicle shown in Fig. 1;

Fig. 3 is a vertical section taken along line 3—3 of Fig. 1, but with the added structure of a heat conveying tube across the top of the bottom dump operating mechanism housing; while Fig. 4 is an enlarged sectional view taken along line 4—4 of Fig. 1.

While this invention might be adapted to various types of vehicles, the drawings disclose it applied to a conventional type of bottom dump body or wagon.

The propelling vehicle is indicated generally at 11. This vehicle may be a tractor or any other type of prime mover. The heated bottom dump body or wagon 12 has a drawbar 14 pivotally attached to the vehicle by a hitch 13. The hot exhaust gases from the vehicle motor, such as an internal combustion engine, emerge from the exhaust pipe 15, as in any conventional type tractor. A flexible conduit 15a connects the exhaust pipe of the vehicle to the dump body 12 to be heated. The conduit includes a coupling 16 forming a swivel connection in the conduit so that the section attached to the exhaust pipe 15 may swivel with respect to the section attached to the bottom dump wagon. This swivel permits 90 degree turning between tractor 11 and trailer wagon 12. A Y-connection is also formed immediately above the swivel coupling 16 so as to divide the single stream of hot exhaust gases from exhaust pipe 15 into two paths, one going to each side wall of the dump wagon.

The heated, bottom dump body or wagon 12 has an open top for loading. It is mounted on wheels and pivotally attached to the propelling vehicle as a semi-trailer. The downwardly inclined side walls or panels 17 and the end walls 18 and 19 form the sides of the dump body to enclose and support the load. Longitudinally extending headers or ribs 20, 21, 22 and 23 are located at the upper and lower edges of each of the side walls. The lower header in each side wall is attached at its forward end to one of the two Y-branches of the flexible conduit 15a to receive the hot exhaust gases. Vertically extending branch tubes or ribs 24 connect the upper and lower headers in each side wall and provide flow communication between them. These headers and tubes serve a dual function. They strengthen the side walls as well as convey the hot gases. They provide a new use for the rigidly attached strengthening ribs connected to the walls in this type of dump wagon. Each rib 24 is rigidly attached to side wall 17 by welds 24a and 24b, as shown in Fig. 4. Ribs 20 and 22 are attached to the side wall by welds 20a, 20b, 20c and 22a, 22b, respectively. The all welded construction provides a gas tight and rigid strengthening design. Of course, this invention contemplates in its broadest aspects that these headers and tubes and side walls be merely hollow side walls to convey the hot gases. Also, the gas conveying headers and tubes may be attached to any conventional type load carrying body or wagon instead of being strengthening ribs therefor.

Although the rear of all four headers are illustrated as being open to the atmosphere, the rear of the lower header might be plugged or valved, if desired, to obtain a better gas flow under some conditions. The vertically extending tubes 24 might also exhaust directly to the atmosphere instead of into the upper headers 20 and 21. Of course, the cross-sectional area of the headers and tubes could be varied, and butterfly valves of the common variety could be put in strategic places in the flow path so as to control the gas flow in each tube or header. Then, an adequate supply of hot gas will be present wherever it is needed.

This heated bottom dump wagon is ideally suited for use in sub-freezing weather. Normally, the moisture in the load will freeze and form a bridge between the downwardly inclined side walls of a dumping wagon of this type. This prevents easy dumping of the load because the bridge blocks the free downward flow of the material from the wagon. In this invention, the hot exhaust gases being conveyed through the load supporting wall portions of the dump body or wagon prevent the moisture from freezing and insure easy, unobstructed load dumping under all weather conditions.

Fig. 3 discloses a modified structure which could be incorporated into the bottom dump wagon of Figs. 1 and 2. Although any type of bottom dump operating mechanism might be used, the mechanism used in Figs. 1 to 3, inclusive, is disclosed in the copending application of Stewart Armington on "Clam Shell Door Construction," Serial No. 241,431, filed August 11, 1951.

This bottom dump operating mechanism consists of two doors 26 pivoted to end walls 18, 19 and operated by hydraulic cylinders 27 enclosed in a transverse housing 29 between the side walls 17. Fig. 3 adds to the Fig. 1 structure the transverse tube 28 in the housing 29. This tube heats the inclined side walls of the housing to prevent bridging in the load, as set forth above. Circulation of the hot gas through the tube 28 from the header on one side of the body to the top header on the other side is caused by the differences in temperature and pressure in the hot gases in the two headers. Since the gases in one side wall header may readily lose more heat at any given instant than the gas in the other side wall header, the temperature and pressure of the hot gases in each of the headers, 20 and 21, will vary. Also, the quantity of hot gases flowing in one header at its junction with tube 28 may be greater or less than the quantity of gases flowing in the other header at the opposite end of tube 28.

What I claim is:

1. A heated bottom dump body, comprising a dump body having side walls, a longitudinally extending header on the lower edge of each side wall, a plurality of branch tubes extending upwardly from the header, the front end of the header in each side wall being adapted to be attached to a flexible tube from the hot exhaust of a propelling vehicle, and the top of the branch tubes having a connection to the atmosphere for exhaust, whereby the hot gases from the propelling vehicle move continuously by natural convection through the length of the header and upwardly through the branch tubes to exhaust to the atmosphere so as to heat continuously the side walls for easier dumping in freezing weather.

2. A heated dump body, comprising a dump body having side walls, a longitudinally extending header on the upper and lower edges of each side wall, a plurality of branch tubes in each side wall spaced along the length of both headers in said side wall with each extending upwardly from the lower header and connected at its upper end to the upper header, the front end of the lower header in each side wall being adapted to be attached to a flexible tube from the hot exhaust of a propelling vehicle, and the rear of the upper header being open to the atmosphere for exhaust, whereby the hot gases from the propelling vehicle move continuously by natural convection rearwardly through substantially the entire length of the lower header, upwardly through all of the spaced branch tubes and rearwardly through substantially the entire upper header to exhaust at the rear to the atmosphere so as to supply heat continuously to the side walls for easier dumping in freezing weather.

3. In a tractor-trailer combination, a propelling tractor vehicle having a hot exhaust gas pipe, a trailer dump body pivotally attached by means of a hitch to said propelling vehicle as a semi-trailer, said hitch providing for angular movement between said tractor vehicle and trailer body, a dump body having side walls, a longitudinally extending header on the upper and lower edges of each side wall, a plurality of branch tubes in each side wall extending upwardly from the lower header and connected to the upper header, a flexible conduit between said exhaust pipe and the front end of the lower header in each side wall, and the rear of all headers being open to the atmosphere for exhaust, whereby the hot gases from the propelling vehicle move continuously by natural convection through the length of the lower header, upwardly through the branch tubes and through the upper header to exhaust to the atmosphere so as to heat continuously the side walls for easier dumping in freezing weather, said flexible conduit including a swivel coupling near said hitch for maintaining the exhaust pipe connection during turning movements of the combination.

References Cited in the file of this patent

UNITED STATES PATENTS

| | | |
|---|---|---|
| 873,187 | Taylor et al. | Dec. 10, 1907 |
| 1,146,728 | Manning | July 13, 1915 |
| 1,942,207 | Ferwerda | Jan. 2, 1934 |
| 2,130,131 | Hirshfeld | Sept. 13, 1938 |
| 2,250,825 | Evans | July 29, 1941 |
| 2,322,437 | Gustafson | June 22, 1943 |